July 31, 1934.  R. C. LEWIS ET AL  1,968,255
ROLL GRINDING MACHINE
Filed June 13, 1930   5 Sheets-Sheet 1
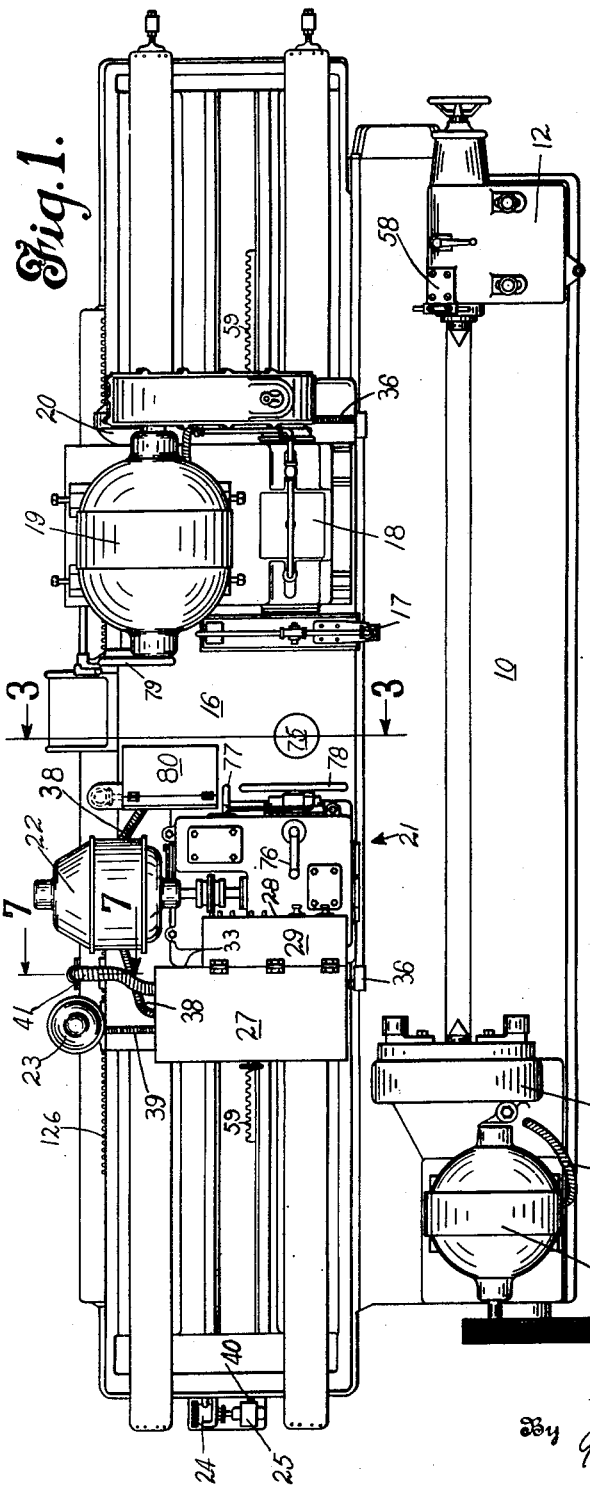
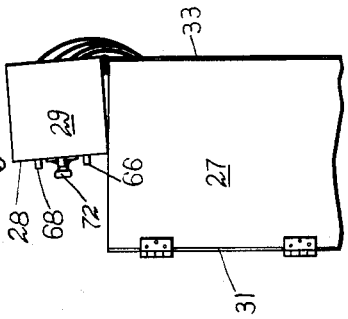
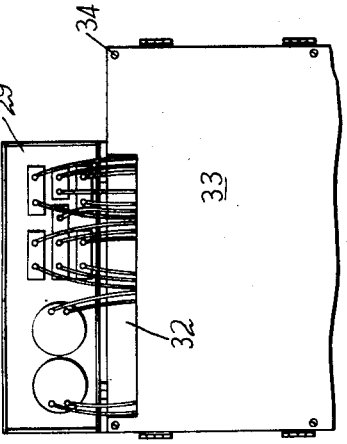
Inventors
Richard C. Lewis
Gunnar V. Hultgren
By Rockwell & Bartholow
Attorneys July 31, 1934.    R. C. LEWIS ET AL    1,968,255
ROLL GRINDING MACHINE
Filed June 13, 1930    5 Sheets-Sheet 2

Inventors
Richard C. Lewis
Gunnar V. Hultgren
By Rockwell & Bartholow
Attorneys

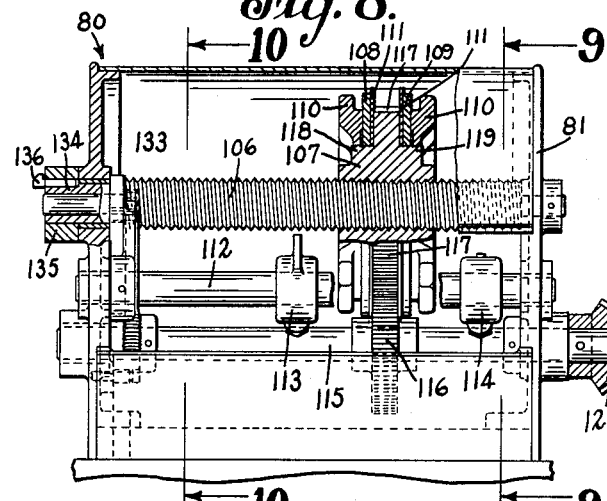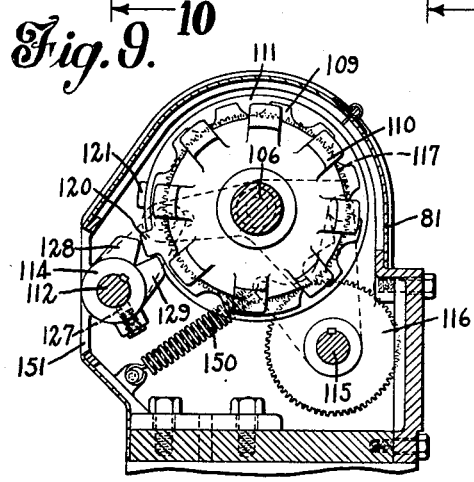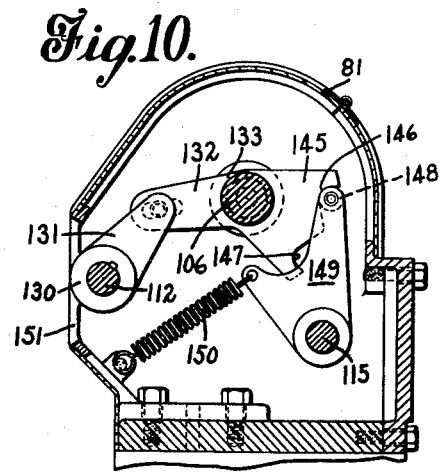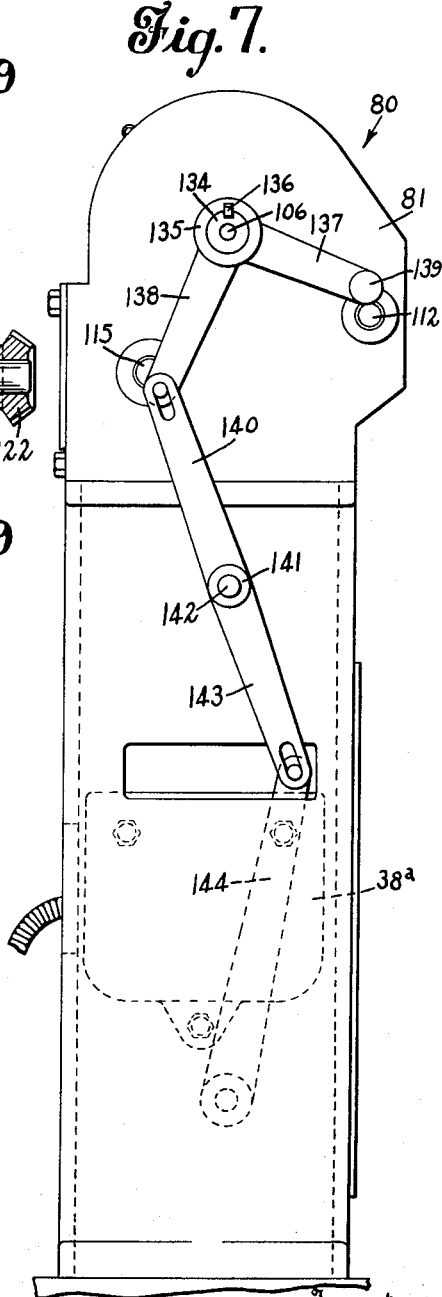

July 31, 1934.  R. C. LEWIS ET AL  1,968,255
ROLL GRINDING MACHINE
Filed June 13, 1930  5 Sheets-Sheet 5

Inventors
Richard C. Lewis
Gunnar V. Hultgren
By Rockwell & Bartholow
Attorneys

Patented July 31, 1934

1,968,255

UNITED STATES PATENT OFFICE 1,968,255

ROLL GRINDING MACHINE

Richard C. Lewis, Ansonia, and Gunnar V. Hultgren, New Haven, Conn., assignors to Farrel-Birmingham Company, Incorporated, Ansonia, Conn.

Application June 13, 1930, Serial No. 460,872

9 Claims. (Cl. 51—50)

This invention relates to grinding machines, and more particularly to machines for grinding heavy work such as large rolls. This invention has particular reference to that type of machine wherein a tool carrying member or carriage, having a cutting tool, tool operating mechanisms, and the electric motors for driving the same, carriage reciprocating and reverse mechanisms and the electric motor driving the same, and a cutting tool coolant pump and its electric motor mounted thereon, is reciprocably mounted upon ways for movement relatively to the work. Usually the machine is also provided with a bearing lubricating fluid pump and electric motor therefor, and an electric motor for rotating the work or head-stock.

Such a machine usually occupies considerable floor space and the motors driving the various devices are widely separated. In the past, controls for these various motors have been disposed adjacent the same or in other separated locations so that it was necessary for the machine operator to travel from one to the other in order to start the various operations of the machine. This has been found to be disadvantageous both at the start and during the operation of the machine due to the fact that the operator while adjusting various controls was not permitted to properly observe the action of the cutting tool upon the work. It is proposed, therefore, by this invention to assemble or locate the various motor controls in a novel manner and dispose them within convenient reach of the operator whereby he may control the various motors and machine operations from a central position, and preferably to locate them upon the reciprocating carriage and adjacent the grinding wheel and the various mechanical controls, such as hand wheels and reversing and gear shifting levers, whereby the machine can be operated with maximum accuracy as well as maximum convenience.

One object of this invention is to provide an improved roll grinder or like machine.

Another object is to provide a readily accessible control device for all of the various motors of a multiple motor driven machine.

Still another object is to provide a housing for the control device, a portion of which will contain, grouped upon one panel, the controls for the various motors, and another portion of which will support, also grouped upon a single panel, a plurality of push buttons operable to cause the operation of such motor controls.

A further object is to provide a combined motor control device and push button control station for a plurality of motors, and to dispose the same upon a machine in such a manner that efficient control of the various motors may be readily had, while permitting the operation of the machine to be continuously observed by the attendant.

A still further object is to provide a combined housing for the motor controls and a push button panel for such controls for a multiple motor driven machine, of such structure that the controls are readily accessible at all times for adjustments, alterations or repairs.

To these and other ends, the invention consists in the novel features and combinations of parts to be hereinafter described and claimed.

In the accompanying drawings:

Fig. 1 is a plan view of a machine embodying the features of this invention;

Fig. 7 is a side view of a carriage reciprocating reversing device;

Fig. 8 is a front view of the upper portion of the same, certain parts being broken away for the sake of clearness;

Fig. 9 is a section on line 9—9 of Fig. 8;

Fig. 10 is a section on line 10—10 of Fig. 8;

Fig. 14 is a front view of the device showing the push button portion of the housing in another position relatively to the motor control portion thereof;

Fig. 15 is a side view of the parts shown in Fig. 14;

Figure 2:
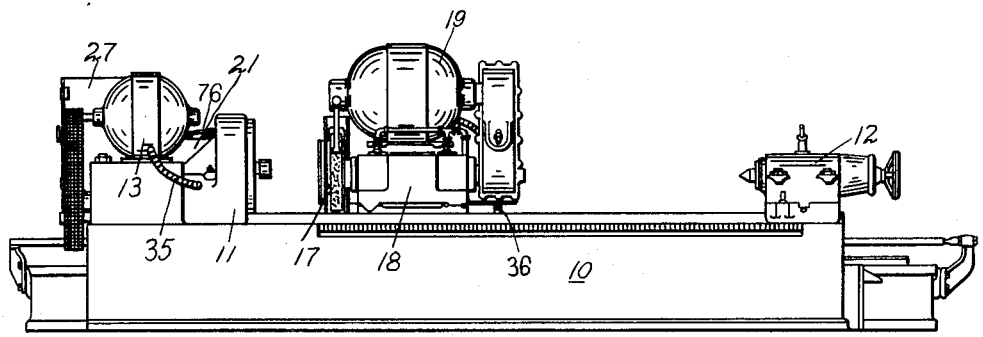
Fig. 2 is a front elevation of the machine, with the reciprocating carriage moved to the left.
Figure 16:
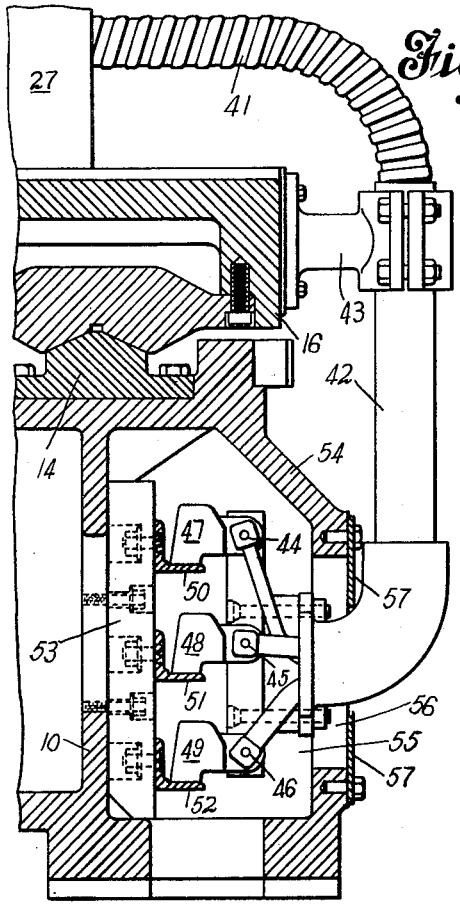
Fig. 16 is a section through the machine, showing the power collecting means and the housing therefor.
Figure 17:
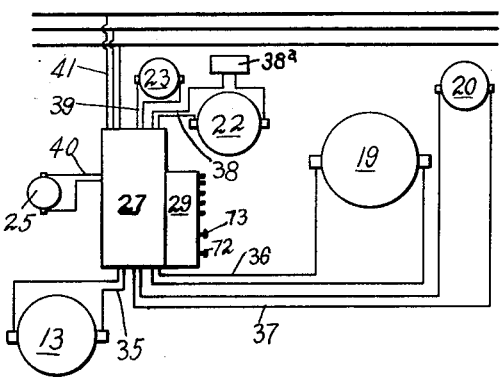
Fig. 17 is a diagrammatic view of the electrical connections to the various motors.

The machine selected to illustrate the features of this invention, is a roll grinding machine adapted to grind large rolls such as paper mill rolls. This machine generally comprises a base 10, upon the front portion of which (Fig. 1) are disposed a head-stock 11 and tail-stock 12, between which the work or roll may be supported and rotated due to the rotation of the head-stock 11 when the same is driven by the head-stock motor 13. The base 10 is provided with ways 14 and 15, that are longitudinally disposed upon the rear portion thereof. A carriage 16 is slidably mounted upon the ways 14 and 15 for movement longitudinally with respect to the work.

The grinding wheel 17 with its supporting structure 18 and driving motor 19, is mounted upon one end of the carriage 16, and as is usual, the wheel support 18 is adapted for transverse movement relatively to the work, provision being made to move the same in such direction by a motor 20 also mounted upon the carriage 16. A carriage reciprocating mechanism 21, with its reversing control means 80 and driving motor 22, is mounted adjacent the other end of the carriage 16. A grinding wheel coolant pump with its motor 23, is also mounted upon the carriage 16. Suitably disposed in respect to the various machine mechanisms is an oil pump 24, whereby the various bearings of the machine mechanisms are supplied with lubricant, and a motor 25 is provided to drive this pump.

Figure 13:
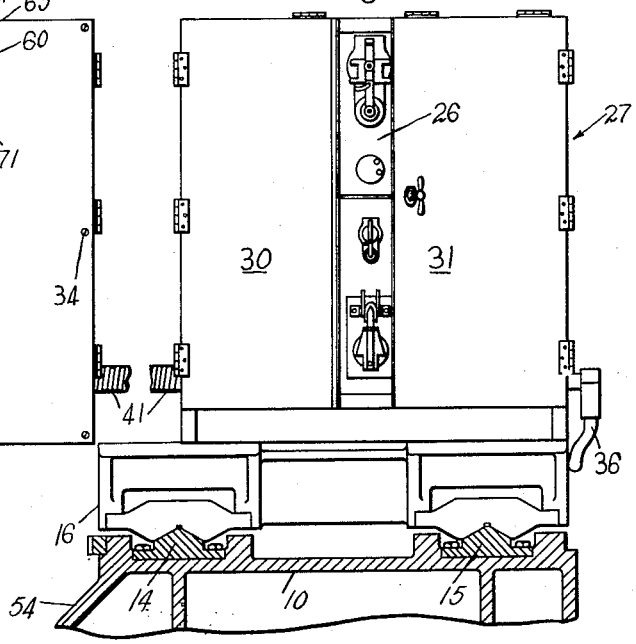
Fig. 13 is a rear view of the same with the housing partly open and showing controls therein.

The various controls for the various motors of this machine, such as resistances, contactors, reversing switches and relays, are grouped together and mounted upon a panel 26 (Fig. 13) which is housed in portion 27 of the control device of this invention. A plurality of push buttons with suitable rheostats are mounted upon a panel 28 that is supported by a portion 29 of the control device. The control device portion or casing 27 is mounted upon an end of the carriage 16, and is provided with a closure by means of which the interior thereof and the controls therein will be accessible. This closure preferably consists of the hinged doors 30 and 31. The portion 29 of the control device is movably secured to the portion 27, preferably by hinging it thereto, as shown, and in its normal position covers an opening 32 (Fig. 14) formed in a plate 33 that is removably secured upon the front of the portion 27 by screws 34. The plate 33 when the casing 29 is in its normal position, forms a rear face therefor. The casing 29, due to its hinged connection with casing 27, may be swung relatively thereto so as to expose the rear face of the panel 28 and the electrical connections and devices thereon to facilitate their installation or repair. The position of casing 29 when so swung relatively to the portion 27 is illustrated in Figs. 14 and 15.

Cables 35, 36, 37, 38, 39 and 40 of motors 13, 19, 20, 22, 23 and 25 respectively, are all directed into the casing 27 of the control device, and suitably connected to the proper controls therein, cable 38 first going to a motor reversing switch 38ᵃ, disposed in casing 81 of the above mentioned carriage reverse control 80, before being led into casing 27. Power is supplied to these controls on the carriage through contact shoes and a cable 41 that is directed upward through and extends outward from a conduit 42, secured to the carriage 16 by a bracket 43. Lower terminals 44, 45 and 46 of the cable 41 are connected to contact shoes 47, 48 and 49 respectively, that contact with fixed bus bars 50, 51 and 52 respectively associated with the bed of the machine and mounted upon a panel 53 secured to the base 10, within a housing 54. The housing 54 is formed by coring out a longitudinally extending opening 55 in the base 10, communicating with which is a slot 56 formed in the outer wall thereof, and in which the lower portion of conduit 42 may freely move during the reciprocation of the carriage 16. Cover plates 57 are provided for the opening 56 in order to substantially close the same, the space between the opposing edges thereof being only sufficient to allow the passage of the lower end of conduit 42.

In this instance, the operation of the various controls disposed in casing or control box 27, for the various motors of this machine (with the exception of that for lubricant pump motor 25), is controlled by suitable manually operable devices that are mounted upon panel 28. Among these are push buttons 64 and 65 which may be operated in a known manner to start and stop, respectively, the grinding wheel motor 19; a snap switch 60 that may be operated to start and stop the work or head-stock rotating motor 13; push buttons 61, 62 and 63 to stop the carriage reciprocating motor 22 and to start the same for carriage movement to the left or right respectively; and push buttons 68 and 69 to control in a known manner the speed of motor 22 to thereby cause rapid reciprocating movement of the carriage to the left or right respectively, this faster than normal movement being desired when initially setting up the machine or when it is desired to traverse the carriage toward the tailstock 12 to true up the grinding wheel by means of a wheel dresser 58. Additional push buttons 66 and 67 control the starting and stopping respectively of the transverse feed motor 20, and push buttons 70 and 71 start or stop respectively the grinding wheel coolant or water pump motor 23. A rheostat handle 72 is also mounted upon the panel 28 and is operable to control the speed of the grinding wheel motor 19, and a rheostat handle 73 is provided to set the carriage reciprocating motor 22 at the normal operating speed that is desired. The lubricant pump motor 25 preferably is started automatically when any part of the machine is placed in operation, in order to insure proper lubrication for the moving parts thereof. This motor is controlled by suitable devices disposed in casing 27, but as above indicated there is no manual control for this motor in the particular machine shown.

The motor 22 is of the reversible type and is controlled by the reversing switch 38ᵃ to cause a change in direction of rotation thereof and thereby change the direction of reciprocation of the carriage 16. The motor 22 drives the carriage 16 by the connection of the motor with a spiral gear 82 that meshes with a rack 59 secured to the machine bed 10. The gear 82 is secured to a shaft 83 that is directed upwardly into the casing of the reciprocating mechanism 21, and has worm wheel 84 secured thereto at its upper end. A worm 85 secured to a shaft 86 is in mesh with the worm wheel 84. Gears 87 and 88, and a clutch member 89 are secured to shaft 86 while a gear 90 is freely rotatable thereon and adapted to be engaged by the clutch member 89 to connect it to shaft 86. A shaft 91, disposed adjacent shaft 86, has gears 92 and 93 and a clutch member 94 secured thereto, while a gear 95 is freely rotatable thereon and adapted to be engaged by the clutch member 94 to connect it to shaft 91. A gear 96, secured to a shaft 97, which is connected by a coupling 98 to the motor shaft 99, is in mesh with gear 92. A clutch operating device 100, operable by lever 77, may be operated to selectively connect gear 82 to the motor for rapid rotation by means of gears 95 and 87, or for slow rotation by means of gears 93 and 90.

The hand wheel 78 is secured to a shaft 101 that extends into the device 21 and has secured upon its inner end a gear 102, that is adapted to mesh with gear 88. Shaft 101 is journaled in a bearing 103 that is vertically tiltable with respect to the device 21. The bearing 103 is mounted within a carrier 104, and due to a connection between carrier 104 and lever 76, which includes a threaded shank 105 working in a fixed nut and forming part of lever 76, the bearing may be raised and lowered as desired to unmesh and mesh gears 88 and 102. By this arrangement the carriage 16 can be manually traversed by hand wheel 78 when such an operation is desired, and when such operation is not desired the hand wheel is tilted to an inoperative position.

The carriage traverse reversing control 80 comprises a stationary lead screw 106, a timing gear 107, and contact rings 108 and 109, clamping rings 110 and guide rings 111 associated with said timing gear. It also comprises a rock shaft 112, contact fingers 113 and 114 thereon, a drive shaft 115, a drive gear 116 for driving gear 107, and the necessary levers to transmit movement from the rock shaft 112 to the reversing switch 38ª. The lead screw 106 extends across the casing 81, and is secured thereto against rotation. The timing gear 107 is mounted upon the lead screw 106, and is provided with threads that cooperate with the threads of the lead screw. Gear teeth 117 are provided upon the timing gear 107, that mesh with the teeth of the drive gear 116. The guide rings 111 and contact rings 108 and 109 are mounted upon hubs 118 and 119, formed on the timing gear 107 and disposed one on either side of the gear teeth 117 thereof. A clamping ring 110 threadingly engages each of the hubs 118 and 119 to retain the contact rings and guide rings thereon. The contact rings 108 and 109 are each provided with an outwardly extending lug 120 and 121, respectively.

Figure 3:
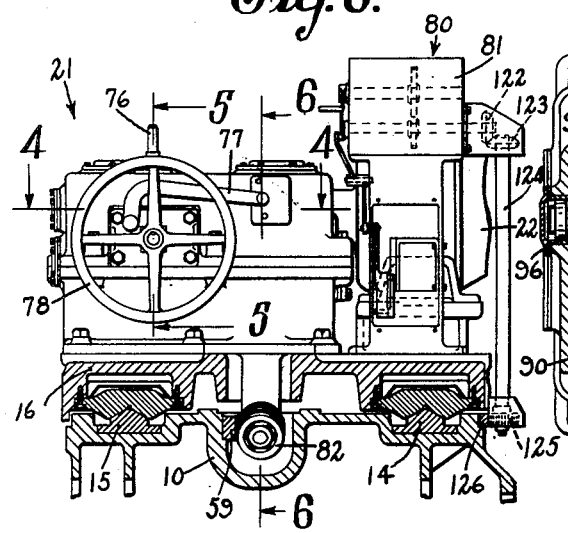
Fig. 3 is a section on line 3—3 of Fig. 1.
Figure 4:
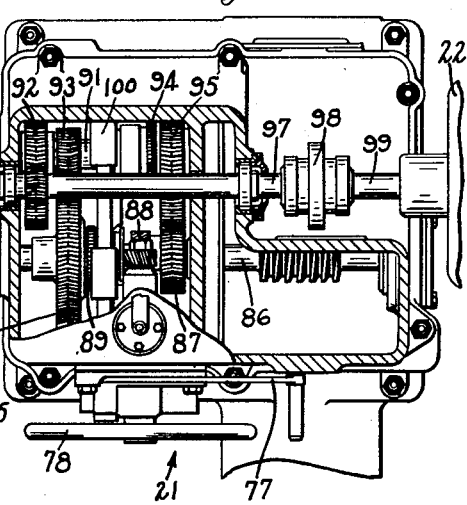
Fig. 4 is a fragmentary plan view partly in section on line 4—4 of Fig. 3.
Figure 5:
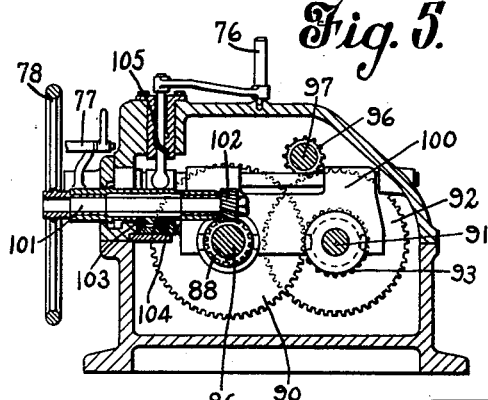
Fig. 5 is a section on line 5—5 of Fig. 3.
Figure 6:
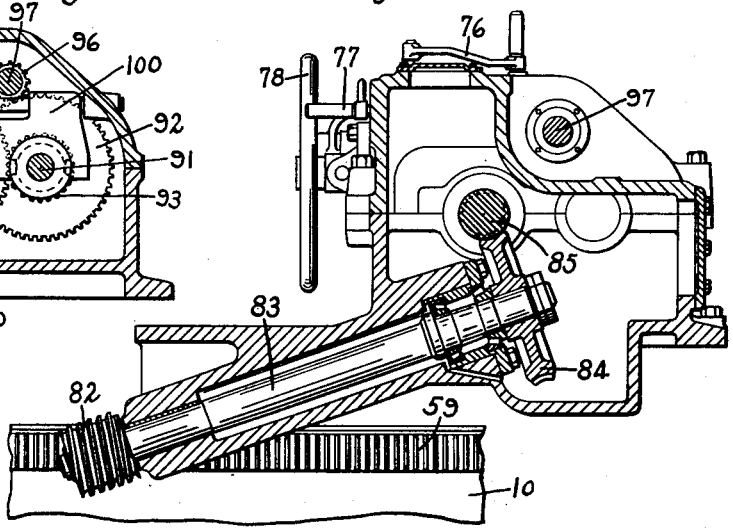
Fig. 6 is a section on line 6—6 of Fig. 3.
Figure 11:
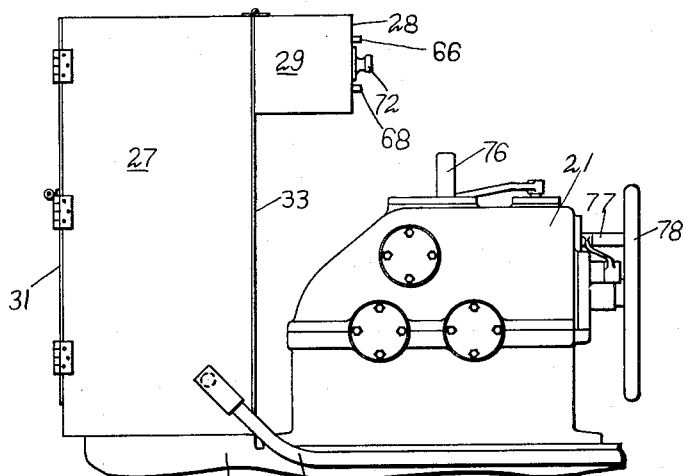
Fig. 11 is a side view of the combined motor control and push button device.
Figure 12:
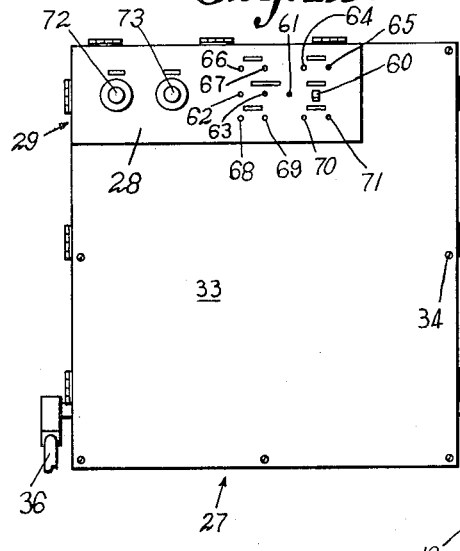
Fig. 12 is a front view of the same.

The drive gear 116 is secured to drive shaft 115, which is journaled in the sides of casing 81, said shaft having a bevel gear 122 secured thereto exteriorly of casing 81. The bevel gear 122 meshes with another bevel gear 123 that is secured to a vertically disposed shaft 124, shown in Fig. 3. The shaft 124 extends downwardly alongside and somewhat below the carriage 16 and at its lower end a pinion 125 is secured. The pinion 125 meshes with a rack 126, secured to the machine bed 10. The gear 116 is slidable axially upon shaft 115 while being rotatable therewith, and is guided and retained in meshed relation at all times with the timing gear 107 by the guide rings 111.

The contact fingers 113 and 114 are mounted upon and keyed to the rock shaft 112, that is journaled in the sides of casing 81. The contact fingers 113 and 114 are axially slidable upon shaft 112, being retained in axially adjusted positions thereon by means of spring pressed plungers 127, that frictionally engage said shaft. The fingers 113 and 114 are each provided with an outwardly extending lug 128 and 129, respectively.

A lever 130 (Fig. 10) is keyed to rock shaft 112, and its arm 131 is secured to an arm 132 of an operating lever 133, that is provided with a sleeve part 134 (Fig. 7) in which one end of the lead screw 106 is supported. The sleeve part 134 is journaled in one side of the casing 81 and extends therethrough a sufficient amount to permit the securing thereto of a lever 135 by a key 136. The lever 135 is provided with two arms, 137 and 138, arm 137 having a handle 139 thereon adapted to be manually engaged when desired, and arm 138 being connected to arm 140 of a lever 141, journaled upon a stud shaft 142, secured to casing 81. Another arm 143 of lever 141 is connected to a lever 144, that is suitably connected to the operating part (not shown) of reverse switch 38ª. This reverse switch is of a type suitable to reverse motor 22, there being various types of such switches which are satisfactory for the purpose. Lever 133 is provided with an arm 145 that has locking notches 146 and 147 formed therein in an end thereof, into which notches a roller 148, secured to the end of a lever 149 may ride, whereby lever 133 may be retained against accidental rocking movement. Lever 149 is mounted for free rocking movement upon shaft 115, and is urged toward the notched end of arm 145 by a spring 150.

During the operation of the machine above described the carriage 16, by its reciprocating movement carries the pinion gear 125 therewith, whereby gear 125 obtains rotative movement from rack 126 and rotates shaft 124. Rotation of shaft 124 through bevel gears 123 and 122, shaft 115 and gear 116, rotates the timing gear 107, upon the lead screw 106, whereby the timing gear 107 moves to the left or right, as the case may be, in synchronism with the travel of carriage 16. When either of the lugs 120 or 121, due to the axial movement of timing gear 107 on lead screw 106, reaches one of the contact fingers 113 or 114, it will engage the respective lug 128 or 129 thereon, and rock rock shaft 112, which movement will be transmitted through levers 130, 133, 135, 141 and 144 to the operating part of switch 38ª, causing operation thereof to change the direction of rotation of the motor 22, thereby causing the reversal of the direction of travel of carriage 16. Reversal of the motor may be effected at any time by hand, when this is desired, by grasping the handle 139 on lever 135, which lever through levers 141 and 144 will actuate the reversing switch to reverse the carriage movement. Axial adjustment of contact rings 108 and 109, upon the respective hubs of timing gear 107, may be made, if required, by loosening the adjacent clamping ring 110, and turning the contact ring about the respective hub upon which it is mounted. The above described carriage traverse reversing mechanism is of particularly efficient and satisfactory character, being composed of relatively few parts and these being assembled in a comparatively simple manner. Adjustment of this mechanism can be readily made even though the machine be in operation. The contact fingers 113 and 114, for instance, can be moved axially along the rock shaft 112 to the desired position by an operator stationed at the point 75 on the carriage by merely reaching through a front opening 151, provided in the casing 81 for this purpose and sliding them along shaft 112.

By the provision of control devices such as above described, the operator stationed upon the carriage 16, for instance at 75, may at all times observe the action of the grinding wheel 17 upon the work and properly control the operation of the various machine mechanisms. The mechanical controls, such as the gear shift levers 76 and 77, the hand wheel 78 for manually moving the carriage, the hand wheel 79 for manually moving the grinding wheel support 18 toward and away from the work, and the carriage traverse reversing mechanism are all disposed upon the carriage 16 within reach of the operator. The electrical controls on panel 28 are also very conveniently located for actuation by the machine operator. In the form of machine illustrated this panel is at the left of the operator stationed on the carriage, within easy reach, and in a location in proximity to the grinding wheel. The provision of a push button casing movable to expose the interior of the control casing 27, greatly facilitates the installation of the controls and the power leads therefor, as well as permitting ready access to the same. The provision of the above described traverse reversing mechanism which is within reach of the operator and which, due to its ready adjustability even during the operation of the machine, insures rapid and accurate results, has been found to substantially increase the efficiency of this type of machine and to decrease the cost thereof. By the provision of the above described features which relate to the operation of the machine the latter can be operated in a very accurate manner and at a faster rate than has heretofore been possible. The machine in practice gives very satisfactory service in the grinding of heavy rolls.

While we have shown and described a preferred embodiment of our invention, it is understood that it is not to be limited to all of the details shown, but is capable of modification and variation which will lie within the spirit of the invention and the scope of the appended claims.

What we claim is:

1. In a grinding machine, a bed having ways, a carriage movable along said ways, a rack on said bed, a shaft on the carriage having a gear engaging said rack, transmission mechanism on the carriage connected with said shaft, an electric motor for driving said shaft through said transmission mechanism, a second rack on the bed, a gear on the carriage meshing with said second rack so as to be rotated by the longitudinal travel of the carriage, and a reversing device operated by said second gear.

2. In a grinding machine, a bed having ways, a carriage movable along said ways, a rack on said bed, a shaft on the carriage having a gear engaging said rack, change speed mechanism on the carriage connected with said shaft, an electric motor for driving said shaft through said change speed mechanism, a second rack on said bed, a gear on the carriage meshing with said second rack so as to be rotated by the longitudinal travel of the carriage, a reversing device operated by said second gear, and a reversing switch for said motor operated by said reversing device.

3. In a grinding machine, a stationary machine member, a movable machine member mounted on said stationary member, means associated with said stationary member and said movable member to move one relatively to the other, and including a rack on one and a gear in mesh with said rack on the other, a reversing device to reverse the direction of relative movement between said members, and means associated with said stationary member and said movable member to operate said reversing device when said members move relatively to each other, said means including a second rack on one of said members, and a second gear in mesh therewith on the other of said members.

4. In a roll grinder, a bed, a carriage adapted to move back and forth along said bed, an electric motor on the carriage, a rack on the bed, means interposed between said electric motor and said rack for traversing the carriage by the rotation of said motor, said motor being reversible, a reversing switch for said motor mounted on the carriage, a timing gear mounted on the carriage operatively connected with said reversing switch to actuate the same, a second rack on the bed, and means interposed between said timing gear and said second rack for actuating the timing gear as the carriage travels along the bed.

5. In a roll grinding machine, a bed, a rotary work support at one side of the bed, a carriage movable along the bed, a grinding wheel on said carriage at the side toward the work support, an electric motor on said carriage, a rack on the bed, means interposed between the electric motor and the rack for traversing the carriage, a timing gear on the carriage, means independent of the connection between said electric motor and the bed for driving said timing gear independently as the carriage travels back and forth, said timing gear including a lead screw, a gear member movable thereon, a rotary traveling gear permanently intermeshing with said gear member for moving the same along the lead screw, and adjustable stop devices adapted to be contacted by said gear member, a reversing switch for said motor, and means for connecting said adjustable stop devices with said reversing switch to actuate the same.

6. In a roll grinder, a bed, a stationary work support at one side of the bed, a carriage movable along the bed, a grinding wheel on the carriage, an electric motor on the carriage for rotating the grinding wheel, an electric motor associated with the work support for rotating the work, an electric motor on the carriage for moving the grinding wheel relatively to the work, an electric motor on the carriage for traversing the carriage, means connecting said last-named motor with the bed for effecting traverse of the carriage, a reversing switch for said last-named motor located on the carriage, a timing gear located on the carriage, means for connecting said timing gear with the bed so that the timing gear is operated during traverse of the carriage, means for connecting said reversing switch with said timing gear to effect reversal of the carriage-driving motor from the timing gear, a housing on the carriage spaced from the grinding wheel so as to provide an operator's station between said housing and said grinding wheel, control devices for all of said electric motors, including the carriage-driving motor, located within said housing, fixed current-carrying members associated with the bed, connections from said current-carrying members to said control devices in said housing, and connections from said control devices to said motors, said reversing switch being interposed in one of said last-named connections.

7. In a roll grinder, a bed, a carriage movable along said bed, an electric motor on said carriage, connections between the motor and bed for traversing the carriage, said motor being reversible, a reversing switch for said motor, mounted on said carriage, timing mechanism on the carriage actuated as the carriage travels back and forth on the bed, including a lead screw, a timing element on the lead screw, means for moving the timing element along the lead screw, a casing for said lead screw, a rock shaft in said casing parallel to said lead screw adapted to be rocked by said timing element, and operative means of connection between said rock shaft and said reversing switch.

8. In a roll grinder, a bed, a carriage movable along said bed, an electric motor on the carriage for reciprocating said carriage, said motor being reversible, a reversing switch for said motor, mounted on said carriage, a casing, lever mechanism mounted exteriorly of said casing and connected to said reversing switch to actuate the same, said lever mechanism being adapted for manual operation, a traveling timing element in said casing, means for operating said element by the traverse of the carriage, and an element in said casing adapted to be shifted by said timing element for operating said lever mechanism, said shiftable element being operatively connected with said exterior lever mechanism.

9. In a roll grinder, a bed, a carriage movable along said bed, an electric motor on the carriage for reciprocating the same, said motor being reversible, a reversing switch for the motor, mounted on said carriage, timing mechanism on the carriage comprising a casing having an interior lead screw, a timing element movable along said lead screw, a shaft in said casing adapted to be shifted by said timing element, mechanism at the exterior of the casing connected with said reversing switch to actuate the same, and means for transmitting movement from said shaft to said exterior mechanism.

RICHARD C. LEWIS.
GUNNAR V. HULTGREN.